United States Patent
Wu et al.

(10) Patent No.: US 11,623,183 B2
(45) Date of Patent: Apr. 11, 2023

(54) SYNTHESIS OF IMIDAZOLIUM-BASED FUNCTIONAL IONIC LIQUID COPOLYMER AND PREPARATION METHOD OF ALLOY ULTRA-FILTRATION MEMBRANE

(71) Applicant: Tiangong University, Tianjin (CN)

(72) Inventors: Chunrui Wu, Tianjin (CN); Chao Tang, Tianjin (CN); Renwei Zhang, Tianjin (CN); Jingguo She, Tianjin (CN); Xiaolong Lv, Tianjin (CN)

(73) Assignee: Tiangong University, Tianjin (CN)

( * ) Notice: Subject to any disclaimer, the term of this patent is extended or adjusted under 35 U.S.C. 154(b) by 62 days.

(21) Appl. No.: 17/246,113

(22) Filed: Apr. 30, 2021

(65) Prior Publication Data
US 2021/0346847 A1 Nov. 11, 2021

(30) Foreign Application Priority Data
May 7, 2020 (CN) .......................... 202010375102.7

(51) Int. Cl.
*B01D 61/14* (2006.01)
*B01D 67/00* (2006.01)
*B01D 71/30* (2006.01)
*B01D 71/40* (2006.01)
(Continued)

(52) U.S. Cl.
CPC ....... *B01D 67/0013* (2013.01); *B01D 61/145* (2013.01); *B01D 67/0006* (2013.01);
(Continued)

(58) Field of Classification Search
CPC .............. B01D 61/145; B01D 67/0006; B01D 67/0013; B01D 2325/16; B01D 2325/36; C08F 226/06
See application file for complete search history.

(56) References Cited

U.S. PATENT DOCUMENTS

2022/0080367 A1* 3/2022 Li ..................... B01D 71/68

FOREIGN PATENT DOCUMENTS

| CN | 108176255 A | * | 6/2018 | ............. B01D 61/40 |
| CN | 109433027 A | * | 3/2019 | |
| CN | 110743395 A | * | 2/2020 | ........... B01D 61/145 |

OTHER PUBLICATIONS

LV X—CN-109433027-A machine translation—Mar. 2019 (Year: 2019).*
(Continued)

*Primary Examiner* — Bradley R Spies
(74) *Attorney, Agent, or Firm* — Bochner IP, PLLC; Andrew D. Bochner

(57) ABSTRACT

The present disclosure provides the synthesis of an imidazolium-based functional ionic liquid copolymer (PMMA-b-PIL-R*) and a preparation method of an alloy ultra-filtration membrane. Firstly, PMMA-b-PIL-R* is prepared from methyl methacrylate (MMA) and polymerizable imidazolium-based functional ionic liquid (IL-R*) containing double bonding as the reactive monomers through sequential radical polymerization. With the use of a non-solvent induced phase separation method, PMMA-b-PIL-R* is introduced into the body of a polymeric membrane material, so as to prepare an alloy ultra-filtration membrane. A hydrogen-bond interaction is generated between the carbonyl in the molecular chain of PMMA-b-PIL-R* and the H . . . C—Cl structure in the molecular chain of the polymeric membrane material, which enhances the compatibility between the molecular chains of PMMA-b-PIL-R* and the polymeric membrane material, so that it can be stable in the ultra-filtration membrane; the imidazole groups and functional groups in the molecular chain of PMMA-b-PIL-R* can provide a good hydrophilicity.

7 Claims, 1 Drawing Sheet

(51) Int. Cl.
  B01D 71/64   (2006.01)
  C08F 226/06  (2006.01)
  B01D 69/06   (2006.01)
  B01D 69/08   (2006.01)

(52) U.S. Cl.
  CPC .......... *B01D 67/0011* (2013.01); *B01D 69/06* (2013.01); *B01D 69/08* (2013.01); *B01D 71/30* (2013.01); *B01D 71/40* (2013.01); *B01D 71/64* (2013.01); *C08F 226/06* (2013.01); *B01D 2323/08* (2013.01); *B01D 2323/12* (2013.01); *B01D 2323/35* (2013.01); *B01D 2325/36* (2013.01)

(56) References Cited

OTHER PUBLICATIONS

Cheng L—CN-108176255-A—Jun. 2018 (Year: 2018).*
Karkhanechi, Hamed, et al. "Preparation and characterization of polyvinylidenedifluoride-co-chlorotrifluoroethylene hollow fiber membranes with high alkaline resistance." Polymer 145 (2018): 310-323. (Year: 2018).*
Du, Chun-hui, et al. "Polymerizable ionic liquid copolymer P (MMA-co-BVIm-Br) and its effect on the surface wettability of PVDF blend membranes." Chinese Journal of Polymer Science 33.6 (2015): 857-868. (Year: 2015).*
Ye, Yuesheng, et al. "Polymerized ionic liquid block and random copolymers: effect of weak microphase separation on ion transport." Macromolecules 45.17 (2012): 7027-7035. (Year: 2012).*
Bi, Xiujie, Shixin Song, and Shulin Sun. "Performance improvement of poly (vinylidene fluoride) by in situ copolymerization of methyl methacrylate and ionic liquid." Macromolecular Research 25.12 (2017): 1163-1171. (Year: 2017).*
Cheng, Y.Y. et al., "Improving the hydrophilic and antifouling properties of poly(vinyl chloride) membranes by atom transfer radical polymerization giafling of poly(ionic liquid) brushes," Polymers for Advanced Technologies, vol. 29, Issue 1, 2017, 9 pages.
Kaushal, S. et al., "Synthesis and characterization of a tin(iv) antimonophosphate nano-composite membrane incorporating 1-dodecyl-3-methylimidazolium bromide ionic liquid," RSC Advances, vol. 7, Issue 21, pp. 12561-12569, 2017, 9 pages.

* cited by examiner

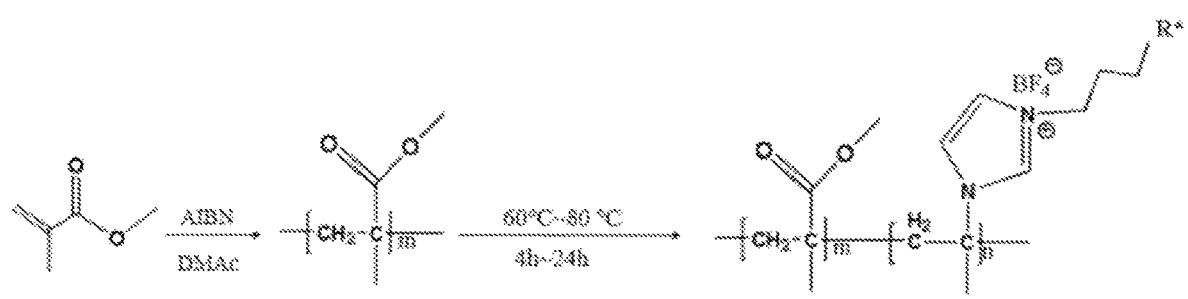

SYNTHESIS OF IMIDAZOLIUM-BASED FUNCTIONAL IONIC LIQUID COPOLYMER AND PREPARATION METHOD OF ALLOY ULTRA-FILTRATION MEMBRANE

TECHNICAL FIELD

The present disclosure relates to the technical field of membrane separation, and specifically relates to the synthesis of PMMA-b-PIL-R* and a preparation method of an alloy ultra-filtration membrane.

BACKGROUND

In recent years, the membrane separation technology has been highly valued by many countries in the world and has been widely used in water treatment. The ultra-filtration membrane has excellent properties of easy preparation, chemical stability and the like, so it is widely applied. However, because most of the ultra-filtration membrane materials are hydrophobic, so they are easy to be polluted by some organic macromolecular matters (including colloidal particles, microorganisms, proteins, etc.) in practical application, resulting in that the performance of the ultra-filtration membrane is reduced, the life is shortened and the operating cost is increased. Improving the hydrophilicity of the membrane surface is beneficial to improve the antifouling property of the membrane. Hydrophilic materials are generally fixed onto the surface of the ultra-filtration membrane by a certain method so as to delay the absorption of protein on the surface, thereby achieving the antifouling purpose.

Ionic liquid has superior thermal and chemical stability, and the diversified selection of molecular structures endows it with a wide range of functional properties matching with the molecular structures, so that it can be widely applied in various fields. Cheng et al introduce poly-1-butyl-3-vinyl imidazolium bromide into the polymeric backbone of the polyvinyl chloride ultra-filtration membrane through a chemical grafting reaction, by which the irreversible flux reduction rate of the polyvinyl chloride membrane is reduced from 67% to 5%. However, such kind of chemical grafting reaction requires harsh reaction conditions, which may generate negative effects on the membrane materials, the membrane structures and the service life. Blending modification has been explored widely because its process is simple, no complicated post-processing steps are required, the modifier can cover the membrane surface and the inner wall of the membrane pores simultaneously, and it would not lead to the destruction of the membrane structure due to the modification of the membrane. Kausha et al employ 1-dodecyl-3-methyl imidazolium bromide as the blending additive to prepare polyvinyl chloride ultra-filtration membrane through a phase inversion technology, of which the water contact angle is reduced from 92.6° to 73.4°, and the flux is increased from 105.6 L/m$_2$ h to 326.3 L/m$_2$ h. However, during the operation of the membrane, small molecular ionic liquid is rapidly lost from the membrane materials, resulting in the rapid degradation of the membrane performance. In conclusion, it is urgent to develop an alloy ultra-filtration membrane with a simple process, low production cost, good hydrophilic, antifouling and mechanical properties, as well as stable performance.

The present disclosure overcomes the following problems, for example, the alloy ultra-filtration membrane itself has strong hydrophobicity and is easily contaminated by proteins, humus and the like, the existing ionic liquid grafting process and the conventional synthesis technology of ionic liquid copolymer are complicated, or small molecule ionic liquid is easy to be lost when added separately, as well as the problems of unstable membrane performance, poor mechanical property and high production cost.

SUMMARY

In view of the above disadvantages of the existing technology, the present disclosure provides a simple synthesis of an imidazolium-based functional ionic liquid copolymer and a preparation method of an alloy ultra-filtration membrane, so as to solve the technical problems of poor hydrophilicity, easy pollution and unstable performance of small molecule ionic liquid in conventional alloy ultra-filtration membrane, as well as the existing complicated synthesis process of ionic liquid copolymers with high cost and high operation requirements.

Another objective of the present disclosure is to prepare amphiphilic PMMA-b-PIL-R* through a simple sequential radical polymerization by using PMMA-b-PIL-R* as the modification additive, so as to improve the hydrophilic properties and mechanical properties of the membrane materials, enhance the antifouling property of the membrane, and prolong the service life of the membrane.

The present disclosure is realized by the following technical solutions.

Synthesis of an imidazolium-based functional ionic liquid copolymer and a preparation method of an alloy ultra-filtration membrane according to the present disclosure, including the following steps:

Step 1. Initiating a sequential radical polymerization of MMA and IL-R* with azodiisobutyronitrile to prepare amphiphilic PMMA-b-PIL-R*;

Step 2. With the use of a non-solvent induced phase separation method, introducing PMMA-b-PIL-R* into the body of a polymeric membrane material, to prepare the alloy ultra-filtration membrane;

In IL-R*, R* is hydroxyl, sulfonic group, carboxyl; the molecular structural formulas of IL-R* and PMMA-b-PIL-R* are shown as below respectively; In PMMA-b-PIL-R*, m is 50~100, and n is 60~120,

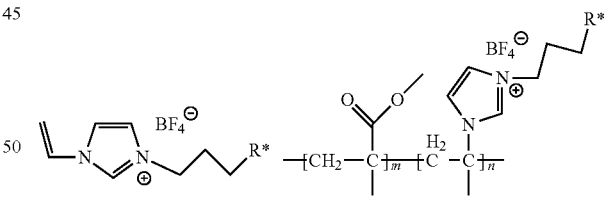

In the synthesis of an imidazolium-based functional ionic liquid copolymer and the preparation method of an alloy ultra-filtration membrane according to the present disclosure, the amphiphilic PMMA-b-PIL-R* is prepared through the following steps: dissolving a certain amount of MMA in a dimethylacetamide solvent and placing in a flask, stirring magnetically, injecting nitrogen into the reaction system to eliminate oxygen, then raising the temperature of the reaction bath to 60° C.~80° C., adding a certain amount of azodiisobutyronitrile initiator to react for 2 h~4 h under the protection of nitrogen;

Weighing a certain amount of IL-R* and adding it into the reaction system, keeping reacting for 4 h~24 h under the protection of nitrogen; at the end of the reaction, immediately placing the resulting copolymer solution into a water-cooling machine containing an iced water solution to cool and terminate the reaction, then pouring the copolymer solution into a precipitating agent until the precipitate evolves, filtering and washing the product with deionized water for 3 times, then freeze drying in a freezing dryer for 10~15 h, obtaining a white copolymer, that is PMMA-b-PIL-R*, sealing storage under normal temperature.

In the synthesis of an imidazolium-based functional ionic liquid copolymer and the preparation method of an alloy ultra-filtration membrane according to the present disclosure, the alloy ultra-filtration membrane is prepared through the following steps: dissolving the vacuum-dried polymer, PMMA-b-PIL-R*, and polyethylene glycol in dimethylacetamide at a certain mass ratio, stirring at a constant temperature of 60° C.~80° C. until well mixed, so as to form a uniform membrane casting solution; at room temperature 25° C., pouring the membrane casting solution onto one end of a clean, undamaged glass plate, scraping the membrane casting solution to the other end evenly using a homemade scraper to form an initial membrane on the glass plate, or pouring the membrane casting solution into a spinning machine to extrude into an initial membrane; pre-evaporating the initial membrane in the air for 5 s~30 s, then placing into a coagulating bath at 25° C. promptly for phase inversion, solidifying into an asymmetric ultra-filtration membrane, then transferring into deionized water at 25° C. and soaking for 24 h, ready for use.

In the above synthesis of an imidazolium-based functional ionic liquid copolymer and the preparation method of an alloy ultra-filtration membrane: IL-R* is one of or a mixture of two or more of 1-hydroxybutyl-3-vinyl imidazolium tetrafluoroborate, 1-sulfobutyl-3-vinyl imidazolium tetrafluoroborate, 1-carboxybutyl-3-vinyl imidazolium tetrafluoroborate, and 1-butyl-3-vinyl imidazolium tetrafluoroborate.

In the above synthesis of an imidazolium-based functional ionic liquid copolymer and the preparation method of an alloy ultra-filtration membrane: the molar ratio of MMA to IL-R* is 2:1~5:1; the polymer is one of or a mixture of two or more of polyvinyl chloride, polytrifluorochloroethylene, polyvinylidene fluoride-chloroethylene copolymer, polyvinylidene fluoride-trifluorochloroethylene copolymer; the mass percentage of PMMA-b-PIL-R* in the polymer is 1%~3%; the alloy ultra-filtration membrane is a flat sheet membrane or a hollow fiber membrane.

The present disclosure has the following beneficial effects: the synthesis of an imidazolium-based functional ionic liquid copolymer and the preparation method of an alloy ultra-filtration membrane according to the present disclosure is based on changing the monomers and reaction conditions as well as based on adjusting the composition of the membrane casting solution through a phase inversion method.

1) The preparation method is based on a combination of a sequential radical polymerization and a non-solvent induced phase separation, for which the requirement on the operation environment is low, the radical polymerization is controllable, the application scope is broad and the operation is continuous and convenient.

2) Hydrogen bonds are generated between the carbonyl in the MMA segment of PMMA-b-PIL-R* molecular chain and the H . . . C—Cl structure in the molecular chain of the membrane material or there may be a dipole-dipole interaction generated between them, so as to enhance the interaction between the molecular chains of PMMA-b-PIL-R* and the membrane material, thus improving the compatibility between them, so that PMMA-b-PIL-R* can be stable in the alloy ultra-filtration membrane, thereby improving its mechanical properties; the imidazole group and functional groups of PMMA-b-PIL-R* can provide good hydrophilicity and obvious antifouling effects.

3) Such a kind of PMMA-b-PILs-R* is a polymer having a certain degree of hydrophilicity and insoluble in water, which can be stable in the membrane body during the long-term operation of the membrane, with a low production cost.

BRIEF DESCRIPTION OF THE DRAWINGS

FIG. 1 is a diagram showing the synthesis principle of PMMA-b-PIL-R* prepared in Example 1.

DETAILED DESCRIPTION

The present disclosure will be further described in detail by the following specific examples, which are only descriptive but not limiting, and shall not be used to limit the protection scope of the present disclosure.

Example 1

1) Synthesis of Amphiphilic PMMA-b-PIL-R*

4.005 g MMA was dissolved in a dimethylacetamide solvent and placed in a flask, and stirred magnetically; nitrogen was injected into the reaction system to eliminate oxygen, then the temperature of the reaction bath was raised to 60° C.; 0.049 g azodiisobutyronitrile initiator was added to react for 2 h under the protection of nitrogen. 5.081 g 1-hydroxybutyl-3-vinyl imidazolium tetrafluoroborate was weighed and added into the reaction system, kept on reacting for 4 h under the protection of nitrogen. At the end of the reaction, the resulting copolymer solution was immediately placed into a water-cooling machine containing an iced water solution to cool and terminate the reaction. Then the copolymer solution was poured into ethyl alcohol until the precipitate evolved; the product was filtered and washed with deionized water for 3 times, then freeze dried in a freezing dryer for 12 h, obtaining a white copolymer (PMMA-b-PIL-R$_1$*), in which m is 50, and n is 60. The molar ratio of MMA, 1-hydroxybutyl-3-vinyl imidazolium tetrafluoroborate and azodiisobutyronitrile was controlled at 2:1:0.015.

2) Preparation of an Alloy Ultra-Filtration Membrane 33.2 g dimethylacetamide, 5.2 g polyvinyl chloride, 1.2 g polyethylene glycol, and 0.4 g PMMA-b-PIL-R$_1$* were stirred at a constant temperature of 60° C. until well mixed to form a uniform membrane casting solution; at room temperature 25° C., the membrane casting solution was poured onto one end of a clean, undamaged glass plate, then scraped to the other end evenly using a homemade scraper to form an initial membrane on the glass plate. The initial membrane was pre-evaporated in the air for 10 s, then promptly placed into a coagulating bath which was deionized water at 25° C. for phase inversion, and solidified into an asymmetric ultra-filtration membrane. The asymmetric ultra-filtration membrane was then transferred into deionized water at 25° C. and soaked for 24 h, ready for use. The alloy ultra-filtration membrane was tested for its performances, with the results shown in Table 1.

The synthetic route of amphiphilic PMMA-b-PIL-R* prepared in Example 1 can be seen from the diagram showing the mechanism of radical polymerization as shown in FIG. 1.

Comparative Example 1

1) 33.6 g dimethylacetamide, 5.2 g polyvinyl chloride, and 1.2 g polyethylene glycol were stirred at a constant temperature of 60° C. until well mixed to form a uniform membrane casting solution;

2) At room temperature 25° C., the membrane casting solution was poured onto one end of a clean, undamaged glass plate, and scraped to the other end evenly using a homemade scraper to form an initial membrane on the glass plate. The initial membrane was pre-evaporated in the air for 10 s, then promptly placed into a coagulating bath which was deionized water at 25° C. for phase inversion, and solidified into an asymmetric ultra-filtration membrane. The asymmetric ultra-filtration membrane was then transferred into deionized water at 25° C. and soaked for 24 h, ready for use. The water contact angle of the resulting membrane was 81.2°. The alloy ultra-filtration membrane was tested for its performances, with the results shown in Table 1.

Comparative Example 2

1) 33.2 g dimethylacetamide, 5.2 g polyvinyl chloride, 1.2 g polyethylene glycol, and 0.4 g 1-hydroxybutyl-3-vinyl imidazolium tetrafluoroborate (IL-$R_1$*) were stirred at a constant temperature of 60° C. until well mixed to form a uniform membrane casting solution;

2) At room temperature 25° C., the membrane casting solution was poured onto one end of a clean, undamaged glass plate, scraped to the other end evenly using a homemade scraper to form an initial membrane on the glass plate. The initial membrane was pre-evaporated in the air for 10 s, then promptly placed into a coagulating bath which was deionized water at 25° C. for phase inversion, and solidified into an asymmetric ultra-filtration membrane. The asymmetric ultra-filtration membrane was then transferred into deionized water at 25° C. and soaked for 24 h, ready for use. The alloy ultra-filtration membrane was tested for its performances, with the results shown in Table 1.

Comparative Example 3

1) 33.2 g dimethylacetamide, 5.2 g polyvinyl chloride, 1.2 g polyethylene glycol, and 0.4 g poly-1-hydroxybutyl-3-vinyl imidazolium tetrafluoroborate (IL-$R_1$*) were stirred at a constant temperature of 60° C. until well mixed to form a uniform membrane casting solution.

2) At room temperature 25° C., the membrane casting solution was poured onto one end of a clean, undamaged glass plate, scraped to the other end evenly using a homemade scraper to form an initial membrane on the glass plate. The initial membrane was pre-evaporated in the air for 10 s, then promptly placed into a coagulating bath which was deionized water at 25° C. for phase inversion, and solidified into an asymmetric ultra-filtration membrane. The asymmetric ultra-filtration membrane was then transferred into deionized water at 25° C. and soaked for 24 h, ready for use. The alloy ultra-filtration membrane was tested for its performances, with the results shown in Table 1.

Example 2

1) Synthesis of Amphiphilic PMMA-b-PIL-R*

10.012 g MMA was dissolved in a dimethylacetamide solvent and placed in a flask, and stirred magnetically; nitrogen was injected into the reaction system to eliminate oxygen, then the temperature of the reaction bath was raised to 70° C.; 0.049 g azodiisobutyronitrile initiator was added to react for 3 h under the protection of nitrogen. 6.361 g 1-sulfobutyl-3-vinyl imidazolium tetrafluoroborate was weighed and added into the reaction system, kept on reacting for 12 h under the protection of nitrogen. At the end of the reaction, the resulting copolymer solution was immediately placed into a water-cooling machine containing an iced water solution to cool and terminate the reaction. Then the copolymer solution was poured into absolute ethyl alcohol until the precipitate evolved; the product was filtered and washed with deionized water for 3 times, then freeze dried in a freezing dryer for 10 h, obtaining a white copolymer (PMMA-b-PIL-$R_2$*), in which m is 70, and n is 90. The molar ratio of MMA, 1-sulfobutyl-3-vinyl imidazolium tetrafluoroborate and azodiisobutyronitrile was controlled at 5:1:0.015.

2) Preparation of PMMA-b-PIL-R* Alloy Ultra-Filtration Membrane 32.8 g dimethylacetamide, 5.2 g polytrifluorochloroethylene, 1.2 g polyethylene glycol, and 0.8 g PMMA-b-PIL-$R_2$* were stirred at a constant temperature of 70° C. until well mixed to form a uniform membrane casting solution. At room temperature 25° C., the membrane casting solution was poured onto one end of a clean, undamaged glass plate, then scraped to the other end evenly using a homemade scraper to form an initial membrane on the glass plate. The initial membrane was pre-evaporated in the air for 5 s, then promptly placed into a coagulating bath which was ethyl alcohol at 10° C. for phase inversion, and solidified into an asymmetric ultra-filtration membrane. The asymmetric ultra-filtration membrane was then transferred into deionized water at 25° C. and soaked for 24 h, ready for use. The alloy ultra-filtration membrane was tested for its performances, with the results shown in Table 1.

Example 3

1) Synthesis of Amphiphilic PMMA-b-PIL-R*

6.072 g MMA was dissolved in a dimethylacetamide solvent and placed in a flask, and stirred magnetically; nitrogen was injected into the reaction system to eliminate oxygen, then the temperature of the reaction bath was raised to 80° C.; 0.049 g azodiisobutyronitrile initiator was added to react for 4 h under the protection of nitrogen. 5.641 g 1-carboxybutyl-3-vinyl imidazolium tetrafluoroborate monomer was weighed and added into the reaction system, kept on reacting for 24 h under the protection of nitrogen. At the end of the reaction, the resulting copolymer solution was immediately placed into a water-cooling machine containing an iced water solution to cool and terminate the reaction. Then the copolymer solution was poured into ethyl alcohol until the precipitate evolved; the product was filtered and washed with deionized water for 3 times, then freeze dried in a freezing dryer for 15 h, obtaining a white copolymer (PMMA-b-PIL-$R_3$*), in which m is 100, n is 120. The molar ratio of MMA, 1-carboxybutyl-3-vinyl imidazolium tetrafluoroborate and azodiisobutyronitrile was controlled at 3:1:0.015.

2) Preparation of PMMA-b-PIL-R* Alloy Ultra-Filtration Membrane 32.4 g dimethylacetamide, 5.2 g polyvinylidene fluoride-chloroethylene copolymer, 1.2 g polyethylene glycol, and 1.2 g PMMA-b-PIL-$R_3$* were stirred at a constant temperature of 80° C. until well mixed to form a uniform membrane casting solution; at room temperature 25° C., the membrane casting solution was poured onto one end of a clean, undamaged glass plate, then scraped to the other end evenly using a homemade scraper to form an initial membrane on the glass plate. The initial membrane was pre-evaporated in the air for 30 s, then promptly placed into a coagulating bath which was isopropanol at 25° C. for phase inversion, and solidified into an asymmetric ultra-filtration membrane. The asymmetric ultra-filtration membrane was then transferred into deionized water at 25° C. and soaked for 24 h, ready for use. The alloy ultra-filtration membrane was tested for its performances, with the results shown in Table 1.

Example 4

1) Synthesis of Amphiphilic PMMA-b-PIL-R*

4.005 g MMA was dissolved in a dimethylacetamide solvent and placed in a flask, and stirred magnetically; nitrogen was injected into the reaction system to eliminate oxygen, then the temperature of the reaction bath was raised to 60° C.; 0.049 g azodiisobutyronitrile initiator was added to react for 2 h under the protection of nitrogen. 4.761 g 1-butyl-3-vinyl imidazolium tetrafluoroborate was weighed and added into the reaction system, kept on reacting for 12 h under the protection of nitrogen. At the end of the reaction, the resulting copolymer solution was immediately placed into a water-cooling machine containing an iced water solution to cool and terminate the reaction. Then the copolymer solution was poured into ethyl alcohol until the precipitate evolved; the product was filtered and washed with deionized water for 3 times, then freeze dried in a freezing dryer for 12 h, obtaining a white copolymer (PMMA-b-PIL-$R_4$*), in which m is 100, n is 120. The molar ratio of MMA, 1-butyl-3-vinyl imidazolium tetrafluoroborate and azodiisobutyronitrile was controlled at 2:1:0.015.

2) Preparation of PMMA-b-PIL-R*alloy ultra-filtration membrane 33.2 g dimethylacetamide, 5.2 g polyvinylidene fluoride-trifluorochloroethylene copolymer, 1.2 g polyethylene glycol, and 0.4 g PMMA-b-PIL-$R_4$* were stirred at a constant temperature of 60° C. until well mixed to form a uniform membrane casting solution. At room temperature 25° C., the membrane casting solution was poured into a spinning machine to extrude into an initial membrane. The initial membrane was pre-evaporated in the air for 10 s, then promptly placed into a coagulating bath which was deionized water at 25° C. for phase inversion, and solidified into an asymmetric ultra-filtration membrane. The asymmetric ultra-filtration membrane was then transferred into deionized water at 25° C. and soaked for 24 h, ready for use. The alloy ultra-filtration membrane was tested for its performances, with the results shown in Table 1.

In order to illustrate the performance effects of the alloy ultra-filtration membrane, the water contact angle was employed to evaluate the hydrophilicity of the membrane surface: the lower the water contact angle, the better the hydrophilicity. The flux recovery rate was employed to evaluate the antifouling property of the membrane: the higher the flux recovery rate, the better the antifouling property. The tensile strength and the elongation at break were employed to evaluate the mechanical property of the membrane: the higher the values, the better the mechanical property of the membrane. Specific results can be seen in Table 1.

TABLE 1

| No. | Water contact angle, (°) | Flux recovery rate (%) | Tensile strength (MPa) | Elongation at break (%) |
|---|---|---|---|---|
| Example 1 | 56.8 | 80.3 | 4.1 | 18.3 |
| Comparative example 1 | 81.2 | 46.4 | 2.3 | 10.5 |
| Comparative example 2 | 75.3 | 58.4 | 1.9 | 9.7 |
| Comparative example 3 | 64.1 | 66.3 | 2.1 | 10.3 |
| Example 2 | 52.6 | 83.2 | 4.0 | 17.8 |
| Example 3 | 52.3 | 83.3 | 4.2 | 17.9 |
| Example 4 | 62.1 | 78.5 | 4.0 | 18.1 |

It can be seen from the comparison between the examples and Comparative example 1 that for the alloy ultra-filtration membrane containing PMMA-b-PIL-R*, the contact angle is reduced, the flux recovery rate is enhanced, both the tensile strength and the elongation at break are increased somewhat, indicating that after the addition of PMMA-b-PIL-R*, the hydrophilic groups on the surface of the alloy ultra-filtration membrane are increased, thus improving the hydrophilicity and delaying the absorption of proteins on the membrane surface, thereby achieving good antifouling effects. At the same time, hydrogen bonds are generated between the carbonyl in the MMA segment of PMMA-b-PIL-R* molecular chain and the H . . . C—Cl structure in the molecular chain of the membrane material or there may be a dipole-dipole interaction generated between them, so as to enhance the interaction between the molecular chains of PMMA-b-PIL-R* and the membrane material, thus improving the compatibility between them, so that PMMA-b-PIL-R* can be stable in the alloy ultra-filtration membrane, thereby improving its mechanical properties. It can be seen from the comparison of the examples and Comparative example 2, Comparative example 3 that the individual addition of IL-R*, PIL-R* can improve the hydrophilicity and antifouling property of the membrane, but they have poor stability in the membrane, resulting in that they are easy to evolve from the membrane, as characterized by the reduction of the tensile strength and the elongation at break, so they only act as the pore-forming agent, and are not suitable for prolonging the service life of the membrane. It can be seen from examples 1, 2, 3 that, the higher the content of PMMA-b-PIL-R*, the lower the contact angle of the membrane surface, the better the hydrophilicity, and the stronger the antifouling property.

The contents that are not described in the examples of the present disclosure are the existing technology, so they are not repeated specifically herein.

The benefits of the present disclosure are as below: 1. The present disclosure employs PMMA-b-PIL-R* as the additive, the synthesis method is simple. 2. In the present disclosure, based on the hydrogen bonds generated between the carbonyl in the MMA segment of PMMA-b-PIL-R* molecular chain and the H . . . C—Cl structure in the molecular chain of the membrane material or a dipole-dipole interaction generated between them, the interaction between the molecular chains of PMMA-b-PIL-R* and the membrane material is enhanced, thus improving the compatibility between them. 3. In the present disclosure, PMMA-b-PIL-R* is added into the membrane casting solution, many hydrophilic functional groups contained in the molecular chain build a hydrophilic surface, so the contact angle is reduced, thus forming a hydration layer on the membrane surface and delaying the absorption of proteins on the surface, so that the flux recovery rate is very high, and the hydrophilicity and antifouling property of the membrane can be greatly improved. 4. Compared with adding ionic liquid alone to prepare the membrane, the PMMA-b-PIL-R* added in the present disclosure has the properties of hydrophilicity and insoluble in water, so it can be stable in the membrane casting solution, thus prolonging the service life of the membrane. 5. In the present disclosure, PMMA-b-PIL-R* is added into the membrane casting solution, which is green economic and simple to do.

The foregoing is only preferable implementation of the present disclosure. It should be noted to persons with ordinary skills in the art that several variations and modifications can be made without deviating from the idea of the present disclosure, which are also covered within the protection scope of the present disclosure.

What is claimed is:

1. Synthesis of an imidazolium-based functional ionic liquid copolymer and a preparation method of an alloy ultra-filtration membrane, wherein: comprising the following steps:
    step 1. initiating a sequential radical polymerization of MMA and IL-R* with azodiisobutyronitrile to prepare amphiphilic PMMA-b-PIL-R*;
    step 2. with the use of a non-solvent induced phase separation method, introducing PMMA-b-PIL-R* into the body of a polymeric membrane material, to prepare the alloy ultra-filtration membrane;
    IL-R* is one of 1-hydroxybutyl-3-vinyl imidazolium tetrafluoroborate, 1-sulfobutyl-3-vinyl imidazolium tetrafluoroborate, and 1-carboxybutyl-3-vinyl imidazolium tetrafluoroborate; the molecular structural formulas of IL-R* and PMMA-b-PIL-R* are shown as below respectively, wherein R* is —CH$_2$—OH, —CH$_2$—HSO$_3$, or —COOH, m is 50~100, and n is 60~120,

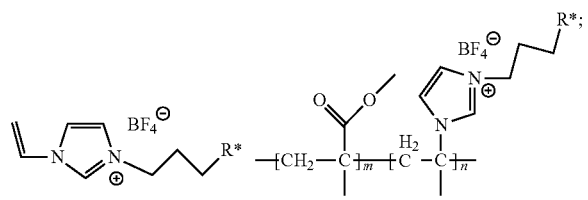

wherein the amphiphilic PMMA-b-PIL-R* is prepared through the following steps:
    dissolving MMA in a dimethylacetamide solvent and placing in a flask, stirring magnetically, injecting nitrogen into the reaction system to eliminate oxygen, then raising the temperature of the reaction bath to 60° C.~80° C., adding azodiisobutyronitrile initiator to react for 2 h~4 h under the protection of nitrogen; and weighing IL-R* and adding it into the reaction system, keeping reacting for 4 h~24 h under the protection of nitrogen; at the end of the reaction, immediately placing the resulting copolymer solution into a water-cooling machine containing an iced water solution to cool and terminate the reaction, then pouring the copolymer solution into a precipitating agent until the precipitate evolves, filtering and washing the product with deionized water for 3 times, then freeze d Ting in a freezing dryer for 10~15 h, obtaining a white copolymer, that is PMMA-b-PIL-R*, sealing storage under normal temperature.

2. The synthesis of an imidazolium-based functional ionic liquid copolymer and the preparation method of an alloy ultra-filtration membrane according to claim 1, wherein: the alloy ultra-filtration membrane is prepared through the following steps: dissolving the vacuum-dried polymer, PMMA-b-PIL-R*; and polyethylene glycol in dimethylacetamide, stirring at a constant temperature of 60° C.~80° C. until well mixed, so as to form a uniform membrane casting solution; at room temperature 25° C., pouring the membrane casting solution onto one end of a clean, undamaged glass plate, scraping the membrane casting solution to the other end evenly using a homemade scraper to form an initial membrane on the glass plate, or pouring the membrane casting solution into a spinning machine to extrude into an initial membrane; pre-evaporating the initial membrane in the air for 5 s~30 s, then placing into a coagulating bath at 25° C. promptly for phase inversion, solidifying into an asymmetric ultra-filtration membrane, then transferring into deionized water at 25° C. and soaking for 24 h, ready for se.

3. The synthesis of an imidazolium-based functional ionic liquid copolymer and the preparation method of an alloy ultra-filtration membrane according to claim 1, wherein: in step 1, the molar ratio of MMA to IL-R* is 2:1~5:1.

4. The synthesis of an imidazolium-based functional ionic liquid copolymer and the preparation method of an alloy ultra-filtration membrane according to claim 1, wherein: the polymer is one of or a mixture of two or more of polyvinyl chloride, polytrifluorochloroethylene, polyvinylidene fluoride-chloroethylene copolymer, polyvinylidene fluoride-trifluorochloroethylene copolymer.

5. The synthesis of an imidazolium-based functional ionic liquid copolymer and the preparation method of an alloy ultra-filtration membrane according to claim 2, wherein: the polymer is one of or a mixture of two or more of polyvinyl chloride, polytrifluorochloroethylene, polyvinylidene fluoride-chloroethylene copolymer, polyvinylidene fluoride-trifluorochloroethylene copolymer; the mass percentage of PMMA-b-PIL-R* in a mixture of polymer, PMMA-b-PIL-R*, polyethylene glycol, and dimethylacetamide is 1%~3%.

6. The synthesis of an imidazolium-based functional ionic liquid copolymer and the preparation method of an alloy ultra-filtration membrane according to claim 1, wherein: the alloy ultra-filtration membrane is a flat sheet membrane or a hollow fiber membrane.

7. The synthesis of an imidazolium-based functional ionic liquid copolymer and the preparation method of an alloy ultra-filtration membrane according to claim 2, wherein: the alloy ultra-filtration membrane is a flat sheet membrane or a hollow fiber membrane.

* * * * *